(12) United States Patent
Ogden

(10) Patent No.: US 10,234,074 B2
(45) Date of Patent: Mar. 19, 2019

(54) POST-MOUNT TEETER FOR USE WITH A SIGNAL DEVICE

(71) Applicant: L&W Industries, LLC, Springfield, MO (US)

(72) Inventor: Stacey Ellis Ogden, Springfield, MO (US)

(73) Assignee: L&W Industries, LLC, Springfield, MO (US)

( * ) Notice: Subject to any disclaimer, the term of this patent is extended or adjusted under 35 U.S.C. 154(b) by 43 days.

(21) Appl. No.: 15/255,214

(22) Filed: Sep. 2, 2016

(65) Prior Publication Data

US 2017/0067594 A1  Mar. 9, 2017

Related U.S. Application Data

(60) Provisional application No. 62/215,762, filed on Sep. 9, 2015.

(51) Int. Cl.
*B61L 5/18* (2006.01)
*F16M 13/02* (2006.01)
*E04H 12/22* (2006.01)

(52) U.S. Cl.
CPC .............. *F16M 13/02* (2013.01); *B61L 5/18* (2013.01); *B61L 5/1854* (2013.01); *B61L 5/1863* (2013.01); *B61L 5/1872* (2013.01); *E04H 12/22* (2013.01)

(58) Field of Classification Search
USPC ......... 248/218.4, 219.1, 219.2, 219.3, 219.4; 362/431; 403/261, 374.3, 187, 188, 192, 403/194, 195, 196, 197, 199, 201
See application file for complete search history.

(56) References Cited

U.S. PATENT DOCUMENTS

| | | | | |
|---|---|---|---|---|
| 1,794,617 A | * | 3/1931 | Howe | B61L 5/1863 246/473.3 |
| 1,936,260 A | * | 11/1933 | Peabody | B61L 5/1836 246/473.3 |
| 5,433,166 A | * | 7/1995 | Donatello | B61L 5/1836 116/202 |
| 7,780,121 B2 | | 8/2010 | Ashton et al. | |
| 2013/0008094 A1 | | 1/2013 | Wood et al. | |

* cited by examiner

*Primary Examiner* — Alfred J Wujciak

(57) ABSTRACT

Examples of the disclosure enable a signal device to be securely coupled to a post. A post-mount teeter includes a stand including a first body, a first flange extending from the first body, and a platform coupled to the first body, and a base including a second body coupled to the first body, a housing coupled to the second body, a second flange extending from the housing, and a sleeve selectively moveable within a cavity defined by the housing to adjust a distance between the sleeve and the housing. Aspects of the disclosure provide for a teeter system that may be used to present signals to one or more users approaching a signal device from one or more directions.

12 Claims, 6 Drawing Sheets

US 10,234,074 B2

POST-MOUNT TEETER FOR USE WITH A SIGNAL DEVICE

CROSS-REFERENCE TO RELATED APPLICATIONS

This application claims the benefit of U.S. Provisional Application No. 62/215,762, filed Sep. 9, 2015.

BACKGROUND

Teeters may be mounted or coupled to a post. At least some known posts and teeters are fabricated from an aluminum material, due to its relatively light weight, high strength-to-weight ratio, and/or resistance to corrosion. Using aluminum materials to fabricate both a post and teeter, however, may create an aluminum-to-aluminum interface that generates a frictional force that makes it difficult to move the teeter along or rotate the teeter about the post.

To reduce the frictional force, some known teeter assemblies include a teeter having a diameter that is larger than a diameter of the post, and a plurality of set screws that are circumferentially spaced about the teeter for coupling the teeter to the post. Decreasing a contact area between the teeter and the post in this manner, however, may allow the teeter to migrate out of alignment over time (e.g., due to vibration from wind) and/or through continued use (e.g., due to vibration from nearby traffic). Moreover, it may be awkward, onerous, and/or inconvenient to access at least some set screws (e.g., set screws positioned on a far side of the post) during installation and/or maintenance of such teeter assemblies.

SUMMARY

Examples of the disclosure enable a signal device to be securely coupled to a post. A post-mount teeter includes a stand including a first body, a first flange extending from the first body, and a platform coupled to the first body, and a base including a second body coupled to the first body, a housing coupled to the second body, a second flange extending from the housing, and a sleeve selectively moveable within a cavity defined by the housing to adjust a distance between the sleeve and the housing.

In another aspect, a teeter assembly includes a signal device configured to present one or more signals, and a teeter including a stand and a base. The stand includes a first body, a first flange extending from the first body, and a platform having an upper surface coupled to the signal device and a lower surface coupled to the first body. The base includes a second body coupled to the first body, a housing coupled to the second body, a second flange extending from the housing, and a sleeve moveable within a cavity defined by the housing to adjust a distance between the sleeve and the housing for securely coupling the base to a post.

In yet another aspect, a method is provided for assembling a teeter system. The method includes coupling a first body of a stand to a second body of a base. The stand includes a first flange extending from the first body, and a platform coupled to the first body. The base includes a housing coupled to the second body, a second flange extending from the housing, and a sleeve moveable within a cavity defined by the housing. The method further includes coupling a signal device to the platform, and moving the sleeve within the cavity to adjust a distance between the sleeve and the housing for securely coupling the base to a post.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

The subject matter described herein relates to a teeter that may be used to couple a signal device to a post. Examples of the disclosure include a teeter including a stand that is coupleable to the signal device and a base that is coupleable to the post. In some examples, the stand is rotatable about a horizontal axis of rotation, and the base is rotatable about a vertical axis of rotation such that a position and/or orientation of a signal device coupled to the teeter may be adjusted.

The teeter may be selectively configured between an adjustable configuration and a secure configuration. In the adjustable configuration, the teeter is coupleable to a post and may be adjusted to selectively position and/or orient a signal device coupled to the teeter. In the secure configuration, the teeter may be securely coupled to the post such that a position and/or orientation of a signal device coupled to the teeter is maintained. In this manner, the teeter may be used to adjust a signal device to a desired position and/or orientation and secure the signal device in the desired position and/or orientation.

Aspects of the disclosure provide the ability to install, service, and/or maintain a teeter in a user-friendly and efficient manner. Moreover, the teeter may be used to effectively and efficiently position and/or orient a signal device coupled to the teeter for presenting one or more signals to one or more users approaching the signal device from one or more directions. For example, the teeter may be used in a railroad environment for presenting one or more signals to one or more users of a railroad track in the railroad environment (e.g., a train operator).

Figure 1:
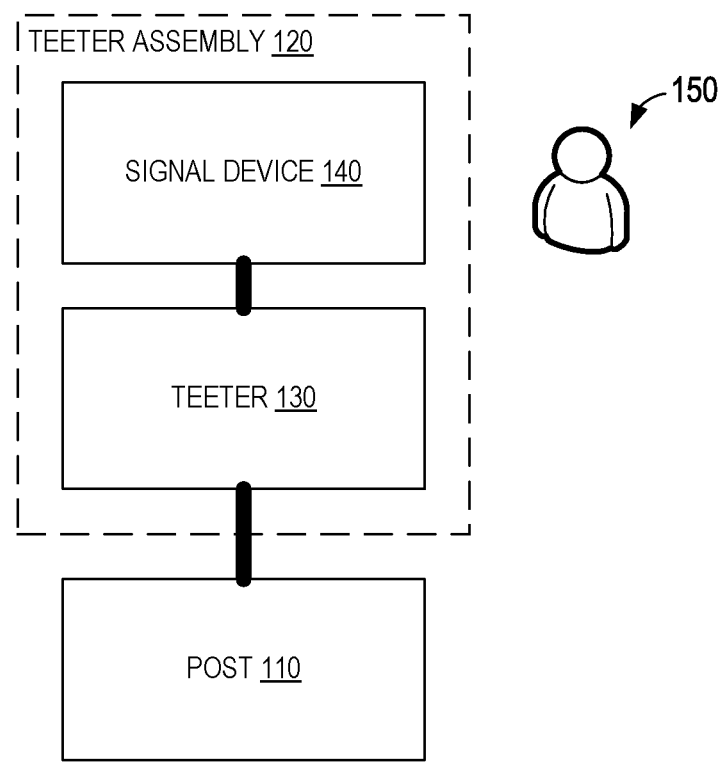
FIG. 1 is a block diagram illustrating an example teeter system.

FIG. 1 is a block diagram illustrating an example teeter system 100 that includes a mast or post 110 and a teeter assembly 120 coupleable to the post 110. The post 110 may be, for example, adjacent to a railroad track, and the teeter assembly 120 may be used for railroad applications. Alternatively, the post 110 and/or teeter assembly 120 may be used in any setting or environment that allows the teeter system 100 to function as described herein.

In some examples, the teeter assembly 120 includes a teeter 130 and a signal device 140 configured to present one or more signals. The teeter 130 enables the signal device 140 to be coupled to the post 110. For example, the signal device 140 may be coupled to a teeter 130 that is coupleable to a post 110. The teeter 130 is actuatable to position and/or orient a signal device 140 coupled to the teeter 130 such that one or more signals may be presented in a desired direction. For example, the signal device 140 may be positioned and/or oriented to present one or more signals towards a user 150 (e.g., a train operator).

Figure 2:
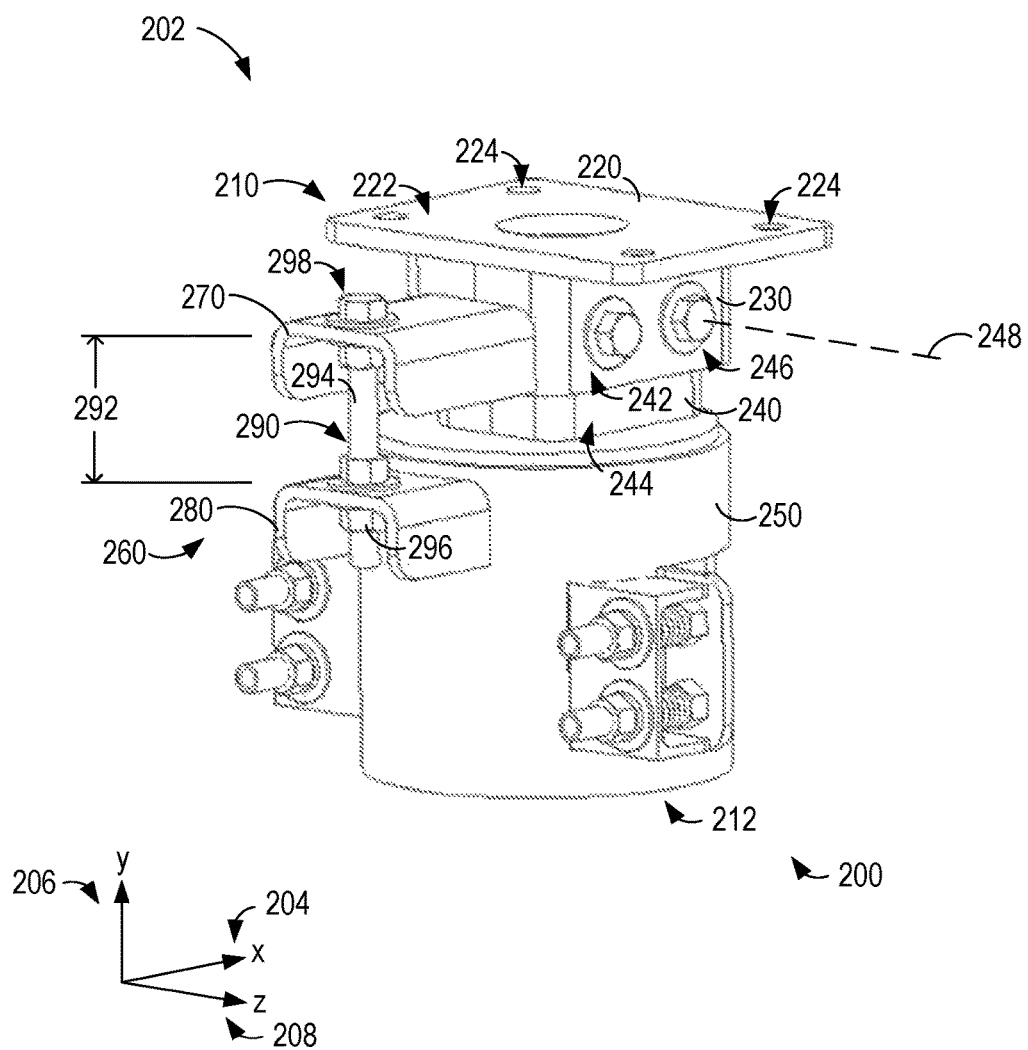
FIG. 2 is a perspective view of an example post-mount teeter that may be used in a teeter system, such as the teeter system shown in FIG. 1.

FIG. 2 is a perspective view of an example post-mount teeter 200 (e.g., teeter 130) that may be used in the teeter system 100. The teeter 200 may be in an environment 202 having a horizontal X-axis 204 extending forward in a positive-X direction and rearward in a negative-X direction, a vertical Y-axis 206 perpendicular to the X-axis 204 extending upward in a positive-Y direction and downward in a negative-Y direction, and a horizontal Z-axis 208 perpendicular to the X-axis 204 and to the Y-axis 206 extending rightward in a positive-Z direction and leftward in a negative-Z direction.

The teeter 200 may be used to couple a signal device 140 (shown in FIG. 1) to a post 110 (shown in FIG. 1). In some examples, the teeter 200 includes a stand 210 that enables the teeter 200 to be coupled to the signal device 140, and a base 212 that enables the teeter 200 to be mounted on or coupled to the post 110. The stand 210 includes a platform 220 coupleable to the signal device 140. For example, an upper surface 222 of the platform 220 may be configured to receive a lower surface of the signal device 140 such that the signal device 140 may be coupled to the platform 220. The upper surface 222 may extend substantially horizontally within the X-Z plane and be substantially planar to accommodate the lower surface of the signal device 140. Additionally or alternatively, the platform 220 may have one or more openings 224 defined therethrough that are configured to receive one or more coupling mechanisms (e.g., bolts) for use in securely coupling the signal device 140 to the platform 220. Alternatively, the platform 220 may have any configuration that enables the stand 210 to function as described herein.

In some examples, the stand 210 includes a first body 230 coupled to the platform 220. For example, an upper surface of the first body 230 may be coupled to a lower surface of the platform 220 such that the first body 230 extends substantially downwardly (e.g., in the negative-Y direction) from the platform 220. The first body 230 may engage a second body 240 of the base 212 such that the stand 210 is coupled to the base 212. In some examples, the first body 230 is slidably coupleable to the second body 240 in a telescoping arrangement. For example, the first body 230 may include a plurality of first body walls 242 at least partially defining a cavity configured to at least partially receive one or more second body walls 244 of the second body 240. When the second body 240 is in the cavity, one or more outer surfaces of the second body walls 244 may face and/or extend substantially parallel to one or more inner surfaces of the first body walls 242. Additionally or alternatively, the first body walls 242 may be at least partially received in a cavity at least partially defined by the second body walls 244.

One or more securing mechanisms 246 may be used to securely couple the first body 230 to the second body 240. The securing mechanisms 246 are configured to at least partially restrict a movement of the first body 230 and/or second body 240. In some examples, the stand 210 is rotatable about a horizontal axis of rotation 248 extending longitudinally along a radial center of a securing mechanisms 246 (e.g., a first securing mechanism) when the securing mechanism 246 is used to couple the stand 210 to the base 212. For example, the stand 210 may be rotated about the horizontal axis of rotation 248 in a first direction such that the upper surface 222 of the platform 220 is tilted toward a forward direction. Conversely, the stand 210 may be rotated about the horizontal axis of rotation 248 in a second direction opposite the first direction such that the upper surface 222 is tilted toward a rearward direction.

In some examples, the base 212 includes a housing 250 coupled to the second body 240. For example, a lower surface of the second body 240 may be coupled to an upper surface of the housing 250 such that the second body 240 extends substantially upwardly (e.g., in the positive-Y direction) from the housing 250. The housing 250 may engage a post 110 to enable the base 212 to be mounted on or coupled to the post 110.

In some examples, a tilt manager 260 is actuatable to manage a rotation of the stand 210 about the horizontal axis of rotation 248. The tilt manager 260 may include a first flange 270 coupled to the first body 230, and a second flange 280 coupled to the housing 250. A front surface of the first flange 270, for example, may be coupled to a rear surface of the first body 230 such that the first flange 270 extends substantially rearwardly (e.g., in the negative-X direction) from the first body 230. Additionally or alternatively, a front surface of the second flange 280 may be coupled to a rear surface of the housing 250 such that the second flange 280 extends substantially rearwardly from the housing 250.

The tilt manager 260 may include one or more coupling mechanisms 290 that may be used to actuate the tilt manager 260. In some examples, the coupling mechanism 290 extends substantially vertically along the Y-axis 206 between the first flange 270 and the second flange 280. The coupling mechanisms 290 may be selectively configured between a secure configuration that enables a distance 292 (e.g., a first distance) between the first flange 270 and the second flange 280 to be securely maintained, and a configuration other than the secure configuration (e.g., an adjustable configuration) that allows the distance 292 to be adjusted.

In some examples, the coupling mechanism 290 includes a bolt 294 and one or more nuts 296 threadably coupled to the bolt 294 such that a nut 296 may be rotated about the bolt 294 to move the nut 296 longitudinally along the bolt 294. The bolt 294 may extend substantially vertically such that a head portion 298 of the bolt 294 is on an upper side of the first flange 270, one or more nuts 296 are between the first flange 270 and second flange 280, and/or a nut 296 is on a lower side of the second flange 280. Alternatively, the coupling mechanism 290 may have any configuration that enables the tilt manager 260 to function as described herein.

When the coupling mechanism 290 is in the secure configuration, the head portion 298 and a nut 296 are adjacent to the first flange 270 to restrict a movement of the first flange 270, and a plurality of nuts 296 are adjacent to the second flange 280 to restrict a movement of the second flange 280 such that the distance 292 is maintained. Conversely, when the coupling mechanism 290 is in an adjustable configuration, the head portion 298 and/or one or more nuts 296 are remote from the first flange 270 and/or second flange 280 to allow a movement of the first flange 270, second flange 280, and/or bolt 294 such that the distance 292 may be adjusted.

When the first flange 270 is moved generally upwardly (e.g., away from the second flange 280) to increase the distance 292, the first flange 270 is rotated about the horizontal axis of rotation 248 in a first direction such that the upper surface 222 of the platform 220 is tilted toward a forward direction. Conversely, when the first flange 270 is moved generally downwardly (e.g., toward the second flange 280) to decrease the distance 292, the first flange 270 is rotated about the horizontal axis of rotation 248 in a second direction opposite the first direction such that the upper surface 222 is tilted toward a rearward direction. In this manner, the coupling mechanism 290 may be used to vertically adjust an orientation of a signal device 140 coupled to the stand 210.

Figure 3:
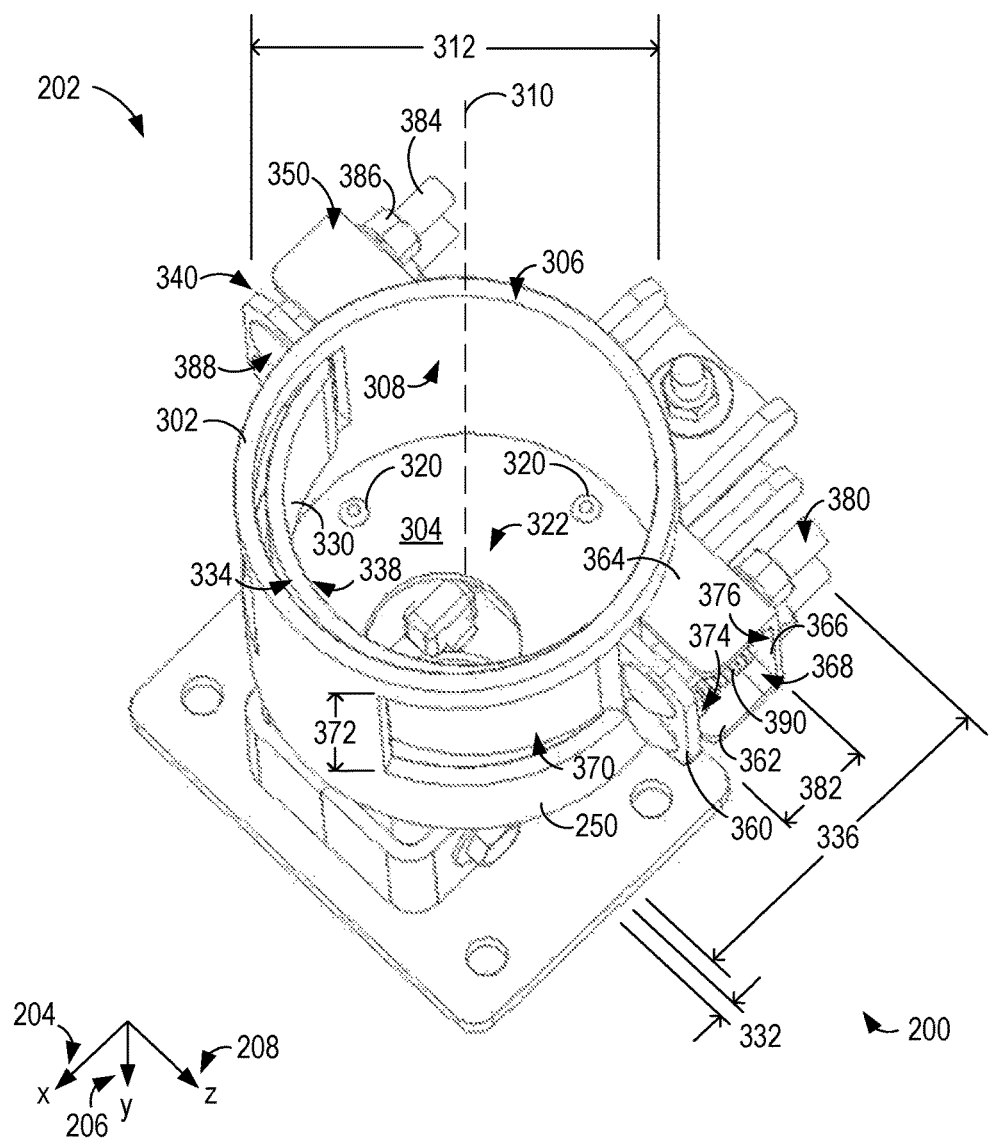
FIG. 3 is a lower perspective view of a teeter, such as the teeter shown in FIG. 2.

FIG. 3 is a lower perspective view of the teeter 200 in the environment 202. The housing 250 has a generally cylindrical configuration including an annular wall 302 that at least partially defines a housing cavity 304 configured to receive at least a portion of the post 110. For example, a lower portion 306 of the annular wall 302 may at least partially define a mouth that allows an upper portion of the post 110 to be introduced to the housing cavity 304 such that an outer surface of the post 110 may face and/or extend substantially parallel to an inner surface 308 of the annular wall 302.

The housing 250 may be configured to allow the base 212 to rotate about a vertical axis of rotation 310 extending longitudinally along a radial center of the post 110 when the housing 250 is coupled to the post 110. For example, the annular wall 302 may have an inner diameter 312 that is larger than an outer diameter of the post 110. Additionally or alternatively, the housing 250 may include one or more projections 320 extending substantially downwardly from an upper inner surface 322 of the housing 250. The projections 320 may be spaced about the upper inner surface 322 such that the projections 320 are coupled to an upper surface of the post 110 when the housing 250 is coupled to the post 110. The projections 320 facilitate decreasing a contact area between the upper inner surface 322 and the upper portion of the post 110. In some examples, the projections 320 may be fabricated from a material that facilitates decreasing a friction generated between the projections 320 and the upper portion of the post 110. For example, the projections 320 may be fabricated from a stainless steel material. Alternatively, the housing 250 may have any configuration that enables the base 212 to function as described herein.

In some examples, the base 212 includes a sleeve 330 within the housing cavity 304. The sleeve 330 may have an arcuate configuration that enables the sleeve 330 to extend generally circumferentially along an arcuate portion of the inner surface 308. The sleeve 330 is moveable between a secure configuration that enables the base 212 to be securely coupled to the post 110, and a configuration other than the secure configuration (e.g., an adjustable configuration) that allows the base 212 to be selectively coupled to, uncoupled from, and/or rotated about the post 110.

When the sleeve 330 is moved toward the secure configuration, a separation distance 332 between an outer surface 334 of the sleeve 330 and a proximate portion of the inner surface 308 may increase, and/or a clamp distance 336 between an inner surface 338 of the sleeve 330 and a remote, opposing portion of the inner surface 308 may decrease. When the sleeve 330 is in the secure configuration, the clamp distance 336 may be the same as or similar to the outer diameter of the post 110 such that the outer surface of the post 110 is coupled to the inner surface 338 and/or to the opposing portion of the inner surface 308. In this manner, the post 110 may be securely maintained between the sleeve 330 and the housing 250 such that the sleeve 330 and/or the housing 250 at least partially restrict the base 212 from rotating about the vertical axis of rotation 310. When the sleeve 330 is moved away from the secure configuration, the separation distance 332 may decrease, and/or the clamp distance 336 may increase such that the base 212 is allowed to rotate about the vertical axis of rotation 310. Alternatively, the sleeve 330 may have any configuration that enables the sleeve 330 to function as described herein.

In some examples, a rotation manager 340 is actuatable to manage a rotation of the base 212 about the vertical axis of rotation 310. The rotation manager 340 may include one or more third flanges 350 coupled to the housing 250, and one or more fourth flange 360 coupled to the sleeve 330. A medial surface of a third flange 350, for example, may be coupled to an outer surface of the housing 250 such that the third flange 350 extends radially outwardly from the housing 250. For example, one third flange 350 may extend substantially rightwardly (e.g., in the positive-Z direction) from the housing 250, and another third flange 350 may extend substantially leftwardly (e.g., in the negative-Z direction) from the housing 250.

The third flange 350 may have a C-shaped configuration including an upper wall 362, a lower wall 364, and a lateral wall 366 that extends between the upper wall 362 and the lower wall 364. The upper wall 362, lower wall 364, and/or lateral wall 366 may at least partially define a recess 368 configured to at least partially receive the fourth flange 360. Alternatively, the third flange 350 may have any configuration that enables the rotation manager 340 to function as described herein.

Additionally or alternatively, a medial surface of a fourth flange 360 may be coupled to an outer surface 334 of the sleeve 330 such that the fourth flange 360 extends radially outwardly from the sleeve 330. For example, one fourth flange 360 may extend substantially rightwardly from the sleeve 330, and another fourth flange 360 may extend substantially leftwardly from the sleeve 330. In some examples, a respective fourth flange 360 may be coupled to and/or extend radially outward from each end portion of the sleeve 330.

The fourth flange 360 may have a substantially planar configuration and extend radially outward through a slot 370 defined through the annular wall 302 such that the fourth flange 360 is circumferentially moveable within the slot 370 along a length of the slot 370. The annular wall 302 may at least partially restrict a movement of the fourth flange 360. For example, the slot 370 may have a slot height 372 that is the same as or substantially similar to a height of the fourth flange 360 such that the fourth flange 360 is at least partially restricted from translating substantially vertically along the Y-axis 206. Alternatively, the fourth flange 360 may have any configuration that enables the rotation manager 340 to function as described herein.

The third flange 350 may engage the fourth flange 360 such that the housing 250 is securely coupled to the sleeve 330. The fourth flange 360 may be positioned between the upper wall 362 and the lower wall 364 such that a rear surface 374 of the fourth flange 360 faces and/or extends substantially parallel to a front surface 376 of the lateral wall 366. When the fourth flange 360 is coupled to the lateral wall 366, the lateral wall 366 may endure at least some pressure along the X-axis 204. In some examples, the upper wall 362 and/or the lower wall 364 are configured to provide structural support to the lateral wall 366 at least along the X-axis 204.

The rotation manager 340 may include one or more adjustment mechanisms 380 that may be used to actuate the rotation manager 340 and/or manage a distance 382 (e.g., a second distance) between the fourth flange 360 and the lateral wall 366. In some examples, the adjustment mechanism 380 extends substantially horizontally along the X-axis 204 between the fourth flange 360 and the lateral wall 366. The adjustment mechanism 380 may be used to move the sleeve 330 between the secure configuration and the adjustable configuration. For example, the distance 382 may be decreased to move the sleeve 330 toward the secure configuration or increased to move the sleeve 330 away from the secure configuration.

In some examples, the adjustment mechanism 380 includes a bolt 384 and one or more nuts 386 threadably coupled to the bolt 384 such that a nut 386 may be rotated about the bolt 384 to move the nut 386 longitudinally along the bolt 384. The bolt 384 may extend through one or more openings defined through the fourth flange 360 and/or the lateral wall 366 such that a head portion 388 of the bolt 384 is on a front side of the fourth flange 360 and a nut 386 is on a rear side of the lateral wall 366. Alternatively, the adjustment mechanism 380 may have any configuration that enables the rotation manager 340 to function as described herein.

When the nut 386 is rotated in a clockwise direction, the head portion 388 and the nut 386 may be urged along the X-axis 204 toward the fourth flange 360 and lateral wall 366 such that the distance 382 is decreased and/or a pressure endured by the fourth flange 360 and/or lateral wall 366 is increased. Conversely, when the nut 386 is rotated in a counterclockwise direction, the head portion 388 and/or the nut 386 may be translated along the X-axis 204 away from the fourth flange 360 and/or lateral wall 366 such that the distance 382 is increased and/or the pressure is decreased. In this manner, the adjustment mechanism 380 may be used to horizontally adjust an orientation of a signal device 140 coupled to the stand 210.

In some examples, the rotation manager 340 includes a biasing mechanism 390 that facilitates managing the distance 382 and/or the pressure endured by the fourth flange 360 and/or lateral wall 366. For example, the biasing mechanism 390 may have a generally helical configuration and extend substantially horizontally along the X-axis 204 between the fourth flange 360 and/or lateral wall 366. In some examples, the biasing mechanism 390 is biased toward a predetermined distance between the third flange 350 and the fourth flange 360. For example, the biasing mechanism 390 may be compressed between the fourth flange 360 and the lateral wall 366 such that the distance 382 is less than the predetermined distance. In this manner, the biasing mechanism 390 may urge the fourth flange 360 away from the lateral wall 366 and/or the lateral wall 366 away from the fourth flange 360 such that the distance 382 is increased and/or the pressure endured by the fourth flange 360 and/or lateral wall 366 is decreased. In some examples, the biasing mechanism 390 is restricted (e.g., by the fourth flange 360 and/or the lateral wall 366) from extending the distance 382 to be greater than the predetermined distance. Alternatively, the biasing mechanism 390 may have any configuration that enables the rotation manager 340 to function as described herein.

Figure 4:
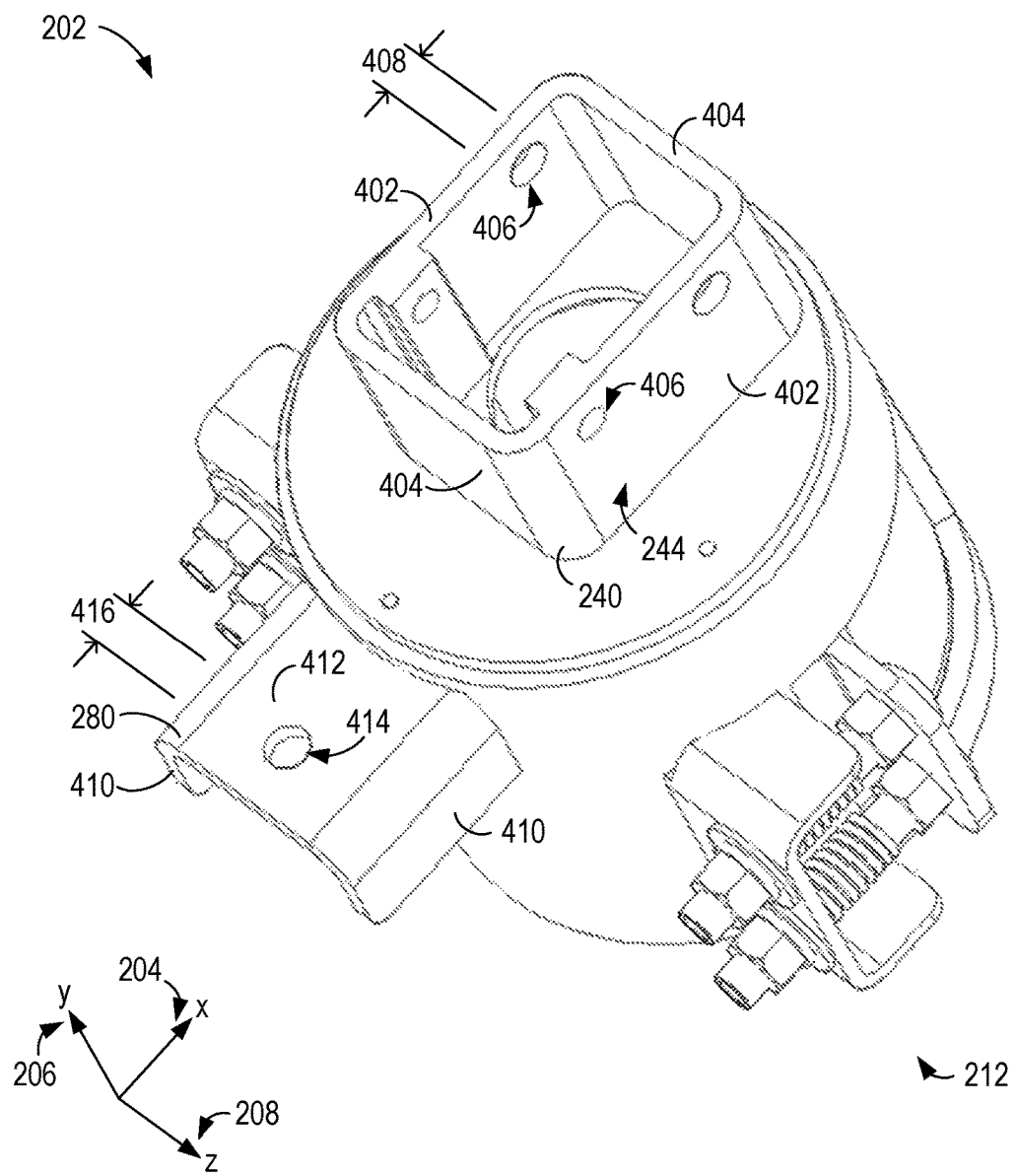
FIG. 4 is an upper perspective view of a base of a teeter, such as the teeter shown in FIG. 2.

FIG. 4 is an upper perspective view of the base 212 in the environment 202. The base 212 includes a second body 240 that has a generally cuboidal configuration including a plurality of second body walls 244. The second body walls 244 may include a plurality of sidewalls 402 and one or more lateral walls 404 extending between the sidewalls 402. The second body 240 may include one or more openings 406 defined through the sidewalls 402. The openings 406 may have a circular configuration and/or have an inner diameter 408 that is the same as or substantially similar to an outer diameter of a securing mechanism 246 (shown in FIG. 2) such that a securing mechanism 246 extending through the opening 406 is restricted from translating substantially horizontally along the X-axis 204 and/or substantially vertically along the Y-axis 206. Alternatively, the second body 240 may have any configuration that enables the base 212 to function as described herein.

The base 212 includes a second flange 280 that has an upside-down U-shaped configuration including a plurality of sidewalls 410 and an upper wall 412 extending between the sidewalls 410. The second flange 280 may include one or more openings 414 defined through the upper wall 412. The openings 414 may have a circular configuration and/or have an inner diameter 416 that is the same as or substantially similar to an outer diameter of a coupling mechanism 290 (shown in FIG. 2) such that a coupling mechanism 290 extending through the opening 414 is restricted from translating substantially horizontally along the X-axis 204 and/or substantially horizontally along the Z-axis 208. Alternatively, the second flange 280 may have any configuration that enables the base 212 to function as described herein.

Figure 5:
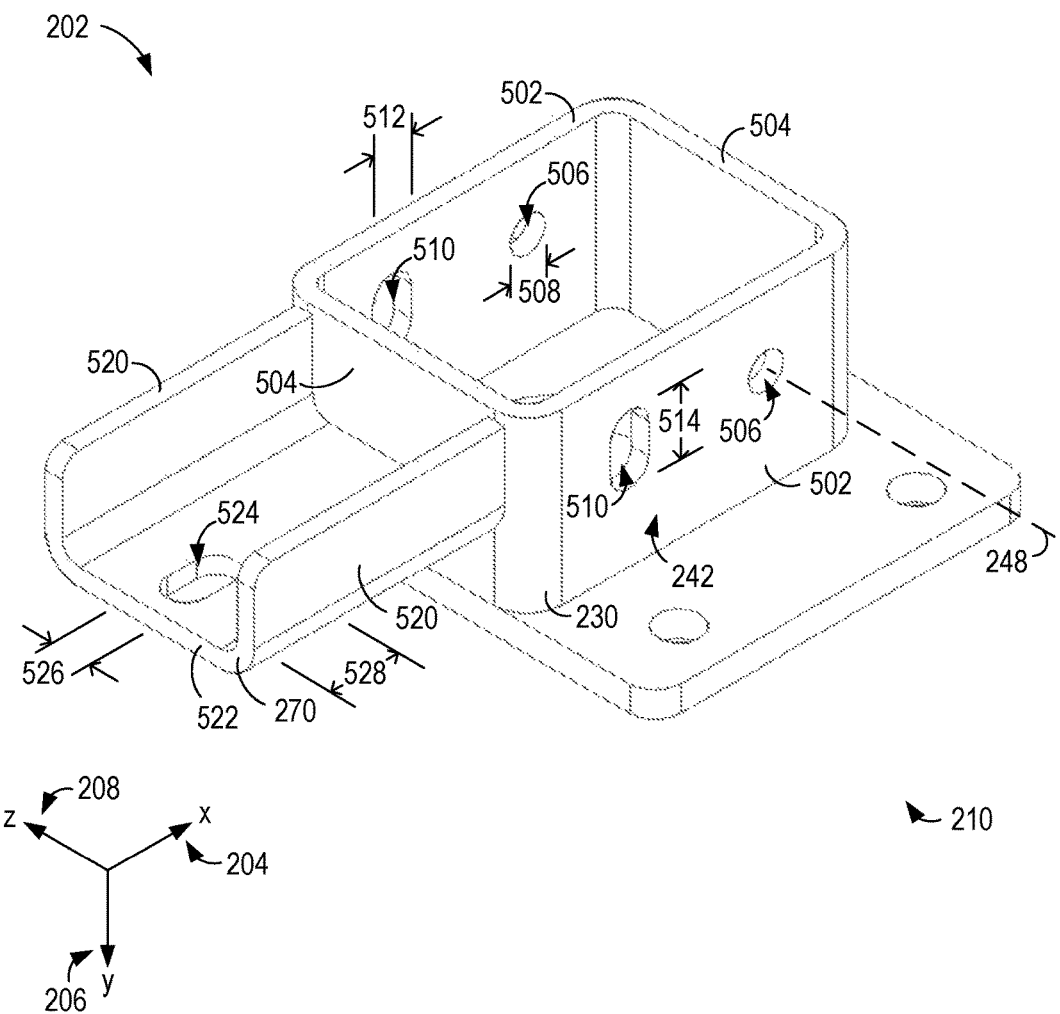
FIG. 5 is a lower perspective view of a stand of a teeter, such as the teeter shown in FIG. 2.

FIG. 5 is a lower perspective view of the stand 210 in the environment 202. The stand 210 includes a first body 230 that has a generally cuboidal configuration including a plurality of first body walls 242. The first body walls 242 may include a plurality of sidewalls 502 and one or more lateral walls 504 extending between the sidewalls 502. In some examples, the first body walls 242 are configured to engage the second body walls 244 such that the stand 210 is moveable with the base 212 when the base 212 is moved within the X-Z plane. For example, the stand 210 and base 212 may be rotated about the vertical axis of rotation 310 (shown in FIG. 3) at a common rate of rotation, including 0 revolutions per minute, when the first body 230 is coupled to the second body 240. In this manner, the base 212 may be selectively rotated about the vertical axis of rotation 310 to horizontally adjust an orientation of a signal device 140 (shown in FIG. 3) coupled to the stand 210.

The first body 230 may include one or more first openings 506 defined through the sidewalls 502. The first openings 506 may have a circular configuration and/or have an inner diameter 508 that is the same as or substantially similar to an outer diameter of a securing mechanism 246 (shown in FIG. 2) such that a securing mechanism 246 extending through the first opening 506 (e.g., a first securing mechanism) is restricted from translating substantially horizontally along the X-axis 204 and/or substantially horizontally along the Z-axis 208.

In some examples, the first body 230 includes one or more second openings 510 defined through the sidewalls 502. The second openings 510 may have an elongated or elliptical configuration, a first inner diameter 512 along the X-axis 204 that is the same as or substantially similar to an outer diameter of a securing mechanism 246 such that a securing mechanism 246 extending through the second opening 510 (e.g., a second securing mechanism) is restricted from translating substantially horizontally along the X-axis 204, and/or a second inner diameter 514 along the Y-axis 206 that is greater than the outer diameter of the securing mechanism 246 such that the second securing mechanism 246 is allowed to translate within the second opening 510 substantially vertically along the Y-axis 206. In this manner, the first body 230 and/or second body 240 may be configured to allow the stand 210 to rotate about the horizontal axis of rotation 248. Alternatively, the first body 230 may have any configuration that enables the stand 210 to function as described herein.

The stand 210 includes a first flange 270 that has an upside-down U-shaped configuration including a plurality of sidewalls 520 and an upper wall 522 extending between the sidewalls 520. The first flange 270 may include one or more openings 524 defined through the upper wall 522. The openings 524 may have an elongated or elliptical configuration, a first inner diameter 526 along the Z-axis 208 that is the same as or substantially similar to an outer diameter of a coupling mechanism 290 (shown in FIG. 2) such that a coupling mechanism 290 extending through the opening 524 is restricted from translating substantially horizontally along the Z-axis 208, and/or a second inner diameter 528 along the X-axis 204 that is greater than the outer diameter of the coupling mechanism 290 such that a coupling mechanism 290 extending through the opening 524 is allowed to translate within the opening 524 substantially horizontally along the X-axis 204. In this manner, the first flange 270 may be configured to allow the stand 210 to rotate about the horizontal axis of rotation 248. Alternatively, the first flange 270 may have any configuration that enables the tilt manager 260 to function as described herein.

Figure 6:
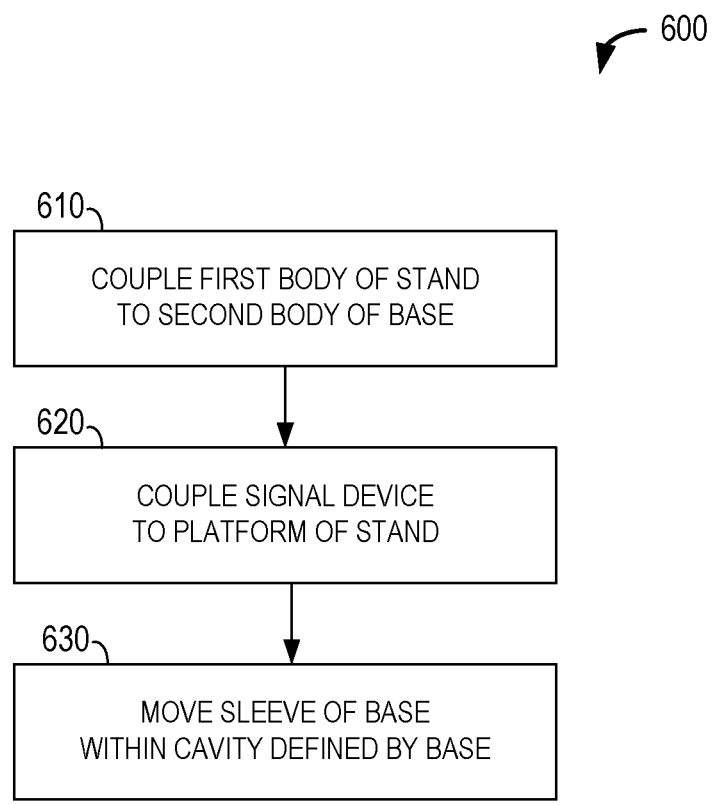
FIG. 6 is a flow chart illustrating an example method of assembling a teeter system, such as the teeter system shown in FIG. 1.

FIG. 6 is a flow chart illustrating an example method 600 of assembling a teeter system 100. A first body 230 of a stand 210 is coupled at 610 to a second body 240 of a base 212. To securely couple the stand 210 to the base 212, one or more securing mechanisms 246 may be extended through one or more openings 406 defined by the first body 230, one or more first openings 506 defined by the second body 240, and/or one or more second openings 510 defined by the second body 240. For example, a first securing mechanism 246 of the securing mechanisms 246 may be extended through the first openings 506 to define a horizontal axis of rotation 248 extending longitudinally along a radial center of the first securing mechanism 246. Additionally, a second securing mechanism 246 of the securing mechanisms 246 may be extended through the second openings 510 between a first flange 270 and the horizontal axis of rotation 248. In some examples, a coupling mechanism 290 is extended between a second flange 280 of the base 212 and a first flange 270 of the stand 210 to facilitate securely coupling the stand 210 to the base 212. For example, the coupling mechanism 290 may be extended through an opening 414 defined by the second flange 280 and through an opening 524 defined by the first flange 270.

A signal device 140 is coupled at 620 to a platform 220 of the stand 210, and a housing 250 of the base 212 is mounted on or coupled to a post 110 such that the teeter 200 is used to couple the signal device 140 to the post 110. The housing 250 may be positioned on the post 110 such that one or more projections 320 extending substantially downwardly from an upper inner surface 322 of the housing 250 are coupled to an upper surface of the post 110. Upon positioning the housing 250 on the post 110, the base 212 may be rotated about a vertical axis of rotation 310 extending longitudinally along a radial center of the post 110 such that the base 212 is in a desired orientation.

A sleeve 330 of the base 212 is moved at 630 within a housing cavity 304 defined by the housing 250 to selectively configure the sleeve 330 between a secure configuration and an adjustable configuration. For example, upon selectively orienting the base 212, the sleeve 330 may be moved to adjust a separation distance 332 and/or clamp distance 336 between the sleeve 330 and an inner surface 308 of the housing 250 such that the base 212 is securely coupled to the post 110. The sleeve 330 may be moved, for example, by actuating an adjustment mechanism 380 extending between a third flange 350 coupled to the housing 250 and a fourth flange 360 coupled to the sleeve 330 to selectively adjust a distance 382 between the third flange 350 and the fourth flange 360.

In some examples, the coupling mechanism 290 is actuated to selectively adjust a distance 292 between the first flange 270 and the second flange 280 such that the stand 210 is in a desired orientation. Additionally, the securing mechanisms 246 may be selectively tightened to facilitate securing a position and/or orientation of the stand 210. In this manner, the securing mechanisms 246, coupling mechanism 290, and/or adjustment mechanisms 380 may be accessed and actuated from a rear portion of the teeter 200 to adjust a position and/or orientation of a signal device 140 coupled to the teeter 200.

The subject matter described herein enables a post-mount teeter to be installed, serviced, and/or maintained in a user-friendly and efficient manner. The examples described herein allow for greater robustness and support and reduced possibility for failure relative to previous implementations. It is contemplated that, in at least some examples, the teeter may be used in any environment that allows the teeter to function as described herein.

The examples illustrated and described herein, as well as examples not specifically described herein but within the scope of aspects of the disclosure, constitute example means for coupling a first body of a stand to a second body of a base, an example means for coupling a signal device to a platform of a stand, and/or an example means for moving a sleeve of the base within a cavity defined by the base.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. Furthermore, references to an "example" or "example" of the present disclosure are not intended to be interpreted as excluding the existence of additional examples or examples that also incorporate the recited features. The terms "comprising," "including," and "having" are intended to be inclusive and mean that there may be additional elements other than the listed elements. The phrase "one or more of the following: A, B, and C" means "at least one of A and/or at least one of B and/or at least one of C."

As used herein, directional terms such as "forward," "rearward," "upward," "downward," "rightward," "leftward," "horizontal," "vertical," "longitudinal," "lateral," "outer," and "inner," as well as any other similar directional terms are used for purposes of clarity in conjunction with the drawings. It will be appreciated that the post-mount teeter 200 may be positioned in any orientation that enables the post-mount teeter 200 to function as described herein.

As used herein, terms of degree such as "substantially," "about," and "approximately" may include a quantitative representation and any reasonable deviation from the quantitative representation that enables the examples described herein to function as described herein. For example, "substantially perpendicular" means positioned at an angle between about 80 degrees and about positive 100 degrees, preferably between about 85 degrees and about 95 degrees, and more preferably about 90 degrees.

Numerical data may be described or presented herein in a range format. A range format is used herein for convenience and brevity and, thus, should be interpreted flexibly to include the numerical values used as the limits of the range, as well as numerical values encompassed within that range as if each numerical value and sub-range is explicitly recited. For example, a range of "about 1 to about 3" should be interpreted to include numerical values of about 1 and about 3 and any numerical value or sub-range included therebetween, including a numerical value of about 2, a sub-range of about 1 to about 2, and a sub-range of about 2 to about 3.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

Alternatively or in addition to the other examples described herein, examples include any combination of the following:
- a signal device configured to present one or more signals;
- a stand including a first body, a first flange extending from the first body, and a platform coupled to the first body;
- a base including a second body coupled to the first body, a housing coupled to the second body, a second flange extending from the housing, and a sleeve selectively moveable within a cavity defined by the housing to adjust a distance between the sleeve and the housing;
- a base including a third flange extending from the housing, and a fourth flange extending from the sleeve;
- one or more securing mechanisms configured to couple the first body to the second body such that the first flange is rotatable about a first securing mechanism of the one or more securing mechanisms;
- one or more securing mechanisms configured to couple the first body to the second body such that at least one securing mechanism is between the first flange and an axis of rotation;
- a coupling mechanism configured to adjust a distance between the first flange and the second flange;
- a coupling mechanism configured to selectively rotate the first flange about an axis of rotation;
- a coupling mechanism configured to manage a rotation of the first flange about the first securing mechanism;
- an adjustment mechanism configured to adjust a distance between the third flange and the fourth flange to selectively manage the distance between the sleeve and the housing;
- an adjustment mechanism biased to maintain a distance between the third flange and the fourth flange;
- an adjustment mechanism configured to adjust a distance between the third flange and the fourth flange such that the base is selectively rotatable about a post; and
- a housing having an upper inner surface and one or more projections extending downwardly from the upper inner surface.

While the aspects of the disclosure have been described in terms of various examples with their associated operations, a person skilled in the art would appreciate that a combination of operations from any number of different examples is also within scope of the aspects of the disclosure.

What is claimed is:

1. A post-mount teeter for use with a signal device, the post-mount teeter comprising:
   a stand comprising a first body, a first flange extending from the first body, and a platform coupled to the first body, the platform coupleable to the signal device;
   a base comprising a second body coupled to the first body, a housing coupled to the second body, a second flange extending from the housing, and a sleeve selectively moveable within a cavity defined by the housing to adjust a first distance between the sleeve and the housing for securely coupling the base to a post, wherein the base further comprises a third flange extending from the housing, and a fourth flange extending from the sleeve; and
   an adjustment mechanism extending between the third flange and the fourth flange, the adjustment mechanism configured to adjust a second distance between the third flange and the fourth flange to selectively manage the first distance between the sleeve and the housing.

2. The post-mount teeter of claim 1 further comprising one or more securing mechanisms configured to couple the first body to the second body such that the first flange is rotatable about at least one securing mechanism of the one or more securing mechanisms.

3. The post-mount teeter of claim 1 further comprising a coupling mechanism extending between the first flange and the second flange, the coupling mechanism configured to adjust a third distance between the first flange and the second flange.

4. The post-mount teeter of claim 1 further comprising a coupling mechanism extending between the first flange and the second flange, the coupling mechanism coupled to the first flange such that the coupling mechanism is configured to selectively rotate the first flange about an axis of rotation.

5. The post-mount teeter of claim 1 further comprising:
   one or more securing mechanisms configured to couple the first body to the second body such that the first flange is rotatable about at least one securing mechanism of the one or more securing mechanisms; and
   a coupling mechanism extending between the first flange and the second flange substantially perpendicular to the at least one securing mechanism, the coupling mechanism configured to manage a rotation of the first flange about the at least one securing mechanism.

6. The post-mount teeter of claim 1, wherein the first body comprises a first sidewall and a second sidewall coupled to a lower surface of the platform, the post-mount teeter further comprising:
   one or more securing mechanisms extending between the first sidewall and the second sidewall such that the one or more securing mechanisms are accessible from a rear portion of the post-mount teeter, the first flange rotatable about at least one securing mechanism of the one or more securing mechanisms; and
   a coupling mechanism extending between the first flange and the second flange such that the coupling mechanism is accessible from the rear portion of the post-mount teeter, the coupling mechanism configured to manage a rotation of the first flange about the at least one securing mechanism.

7. The post-mount teeter of claim 1, wherein the adjustment mechanism is biased to maintain the second distance between the third flange and the fourth flange.

8. The post-mount teeter of claim 1 further comprising:
   one or more securing mechanisms configured to couple the first body to the second body such that the first flange is rotatable about at least one securing mechanism of the one or more securing mechanisms; and wherein the adjustment mechanism extends between the third flange and the fourth flange substantially perpendicular to the at least one securing mechanism, the adjustment mechanism configured to adjust the second distance between the third flange and the fourth flange such that the base is selectively rotatable about a post.

9. The post-mount teeter of claim 1, wherein the first body comprises a first sidewall and a second sidewall coupled to a lower surface of the platform, the post-mount teeter further comprising:

one or more securing mechanisms extending between the first sidewall and the second sidewall such that the one or more securing mechanisms are accessible from a rear portion of the post-mount teeter, the first flange rotatable about at least one securing mechanism of the one or more securing mechanisms; and wherein the adjustment mechanism extends between the third flange and the fourth flange such that the adjustment mechanism is accessible from the rear portion of the post-mount teeter, the adjustment mechanism configured to adjust the second distance between the third flange and the fourth flange such that the base is selectively rotatable about a post.

10. The post-mount teeter of claim 1 further comprising:

a coupling mechanism extending between the first flange and the second flange, the coupling mechanism configured to adjust a third distance between the first flange and the second flange; and wherein the adjustment mechanism extends between the third flange and the fourth flange substantially perpendicular to the coupling mechanism, the adjustment mechanism configured to adjust the second distance between the third flange and the fourth flange such that the base is selectively rotatable about a post.

11. The post-mount teeter of claim 1 further comprising:

a coupling mechanism extending between the first flange and the second flange such that the coupling mechanism is accessible from a rear portion of the post-mount teeter, the coupling mechanism configured to adjust a third distance between the first flange and the second flange; and wherein the adjustment mechanism extends between the third flange and the fourth flange such that the adjustment mechanism is accessible from the rear portion of the post-mount teeter, the adjustment mechanism configured to adjust the second distance between the third flange and the fourth flange such that the base is selectively rotatable about a post.

12. The post-mount teeter of claim 1, wherein the housing has an upper inner surface and one or more projections extending downwardly from the upper inner surface.

* * * * *